United States Patent [19]

Asayama

[11] Patent Number: 5,424,952
[45] Date of Patent: Jun. 13, 1995

[54] VEHICLE-SURROUNDINGS MONITORING APPARATUS

[75] Inventor: Yoshiaki Asayama, Himeji, Japan

[73] Assignee: Mitsubishi Denki Kabushiki Kaisha, Tokyo, Japan

[21] Appl. No.: 213,086

[22] Filed: Mar. 15, 1994

[30] Foreign Application Priority Data

Mar. 26, 1993 [JP] Japan .................. 5-067739

[51] Int. Cl.⁶ ............................. G06F 165/00
[52] U.S. Cl. ....................... 364/443; 364/460;
348/113; 348/118; 348/139; 340/435; 340/903
[58] Field of Search ............ 364/443, 449, 460, 461;
348/113, 116, 118, 139; 340/435, 436, 903

[56] References Cited

U.S. PATENT DOCUMENTS

| 5,023,712 | 6/1991 | Kajiwara | 348/139 |
| 5,159,557 | 10/1992 | Ogawa | 364/460 |
| 5,214,408 | 5/1993 | Asayama | 340/435 |
| 5,223,907 | 6/1993 | Asayama | 348/118 |
| 5,253,050 | 10/1993 | Karasudani | 348/118 |
| 5,309,137 | 5/1994 | Kajiwara | 340/903 |
| 5,369,590 | 11/1994 | Karasudani | 364/461 |
| 5,386,285 | 1/1995 | Asayama | 348/139 |

Primary Examiner—Gary Chin
Attorney, Agent, or Firm—Sughrue, Mion, Zinn, Macpeak and Seas

[57] ABSTRACT

A vehicle-surroundings monitoring apparatus is free from mistakenly identifying a lane marker on a road surface or a guard rail as a vehicle traveling in the blind spot of a nearby lane. A distance detecting section detects the distance up to a vehicle which is traveling in the blind-spot of a nearby lane and which is captured by a plurality of windows as set on a display screen. A detecting range restricting section restricts a distance detecting range for each window to a predetermined range to thereby select as a nearby vehicle an object to which the distance is within the predetermined range.

4 Claims, 6 Drawing Sheets

VEHICLE-SURROUNDINGS MONITORING APPARATUS

BACKGROUND OF THE INVENTION

1. Field of the Invention

The present invention relates to a vehicle-surroundings monitoring apparatus for monitoring the surroundings of a traveling vehicle for, for example, a vehicle traveling in a nearby lane.

2. Description of Related Art

Optical vehicle distance detecting apparatuses which are used as a vehicle-surroundings monitoring apparatus using image sensors have been well known in, for example, Japanese Patent Laid-Open No. 63-38085 and Japanese Patent Laid-Open No. 63-46363. In any case, the apparatuses include a pair of horizontally spaced optical systems which comprise lenses 1, 2 disposed horizontally apart from each other at a reference distance L, image sensors 3, 4 disposed at the focal distance f of these lenses 1, 2, and a signal processing device 30 connected to the image sensors 3, 4, as shown in FIG. 7.

In the conventional vehicle-surroundings monitoring apparatuses, a signal processing device 30 serves to shift image signals from the image sensors 3, 4 to electrically overlap them one over the other to thereby determine a distance R up to an object 31 based on the principles of trigonometry using the following equation:

$$R = f \cdot L / p$$

where p represents a deviation or an amount of shift p by which the above two image signals have the best match.

Japanese Patent Publication No. 4-161810 discloses a distance measuring or detecting method in which a vehicle-surroundings monitoring apparatus sets a plurality of windows on a display screen at specified positions for an image signal in order to detect a distance up to an object captured by these windows based on the principles of trigonometry. However, the conventional vehicle surroundings monitoring apparatus having an optical vehicle distance detecting device described above may mistakenly identify a lane marker (lane-separating line) or guard rail entered into the windows as a vehicle traveling in a nearby lane when the apparatus is used for monitoring following vehicles or nearby vehicles travelling in the adjacent lanes.

SUMMARY OF THE INVENTION

An object of the present invention is to solve the aforementioned problems and provide a vehicle-surroundings monitoring apparatus which is capable of detecting only a vehicle traveling in a nearby lane.

According to one aspect of the present invention, there is provided a vehicle-surroundings monitoring apparatus which is adapted to be mounted on a vehicle for monitoring nearby objects lying therearound, the apparatus comprising: sensing means including two optical systems for sensing the objects lying around the vehicle from two different points and forming images of the objects on image sensor means; display means for displaying images of the objects on a screen; window setting means for setting a plurality of windows on the screen of the display means; distance detecting means for detecting the distance to each object in each of the windows based on the principles of trigonometry by detecting a deviation between images of each object sensed by the two optical systems through comparison therebetween; and detecting range restricting means for restricting a distance detecting range for each window to a predetermined range to thereby select as a nearby vehicle an object to which the distance is within the predetermined range.

According to the construction described above, the object within a lane being monitored is automatically selected and identified as a nearby vehicle on the basis of the results of distance detection in each window. Thus, the apparatus is capable of detecting only an object which lies in each window, and it is free from mistakenly identifying a lane marker or a guard rail as a nearby vehicle traveling in a nearby lane.

It is preferred that the detecting range restricting means restrict the distance detecting range for each window to the predetermined range on the basis of prescribed road information.

Accordingly, an object within a lane being monitored is selected and identified as a nearby vehicle on the basis of the results of distance detection in each window depending on road information, so it is possible to manually or automatically restrict the distance detecting range of each window to only the lane being monitored. Thus, it is possible to suitably set the monitoring range depending on the kind of the road, the traveling speed of the vehicle or the like.

Preferably, the detecting range restricting means limits a total range of shifting for each window to a specific value corresponding to the predetermined range upon detecting the deviation between the images of an object in each window sensed by the two optical systems.

Preferably, the predetermined range for each window is set between a minimum value and a maximum value. The minimum value substantially corresponds to the shortest distance from the vehicle equipped with the apparatus to a nearby lane that is within the field of view of each window and that is adjacent a specific lane in which the vehicle equipped with the apparatus is travelling. The maximum value substantially corresponds to the longest distance therefrom to the nearby lane within the field of view of each window.

Thus, it is not necessary to calculate the amount of shift greater than that limited for each window, thereby reducing the time required for performing arithmetic calculations for distance detection.

DESCRIPTION OF THE PREFERRED EMBODIMENTS

Embodiments of the present invention will now be described in detail while referring to the accompanying drawings.

First, an apparatus for monitoring a nearby vehicle travelling rearwardly and sidewise or in the blank spot of a vehicle equipped with the apparatus in accordance with a first embodiment of the present invention will be described by way of an example with reference to FIGS. 1 through 6. In this embodiment, as illustrated in FIG. 1, the detection of the distance between a vehicle equipped with the monitoring apparatus and another vehicle traveling in a nearby lane will be described below.

Figure 1:
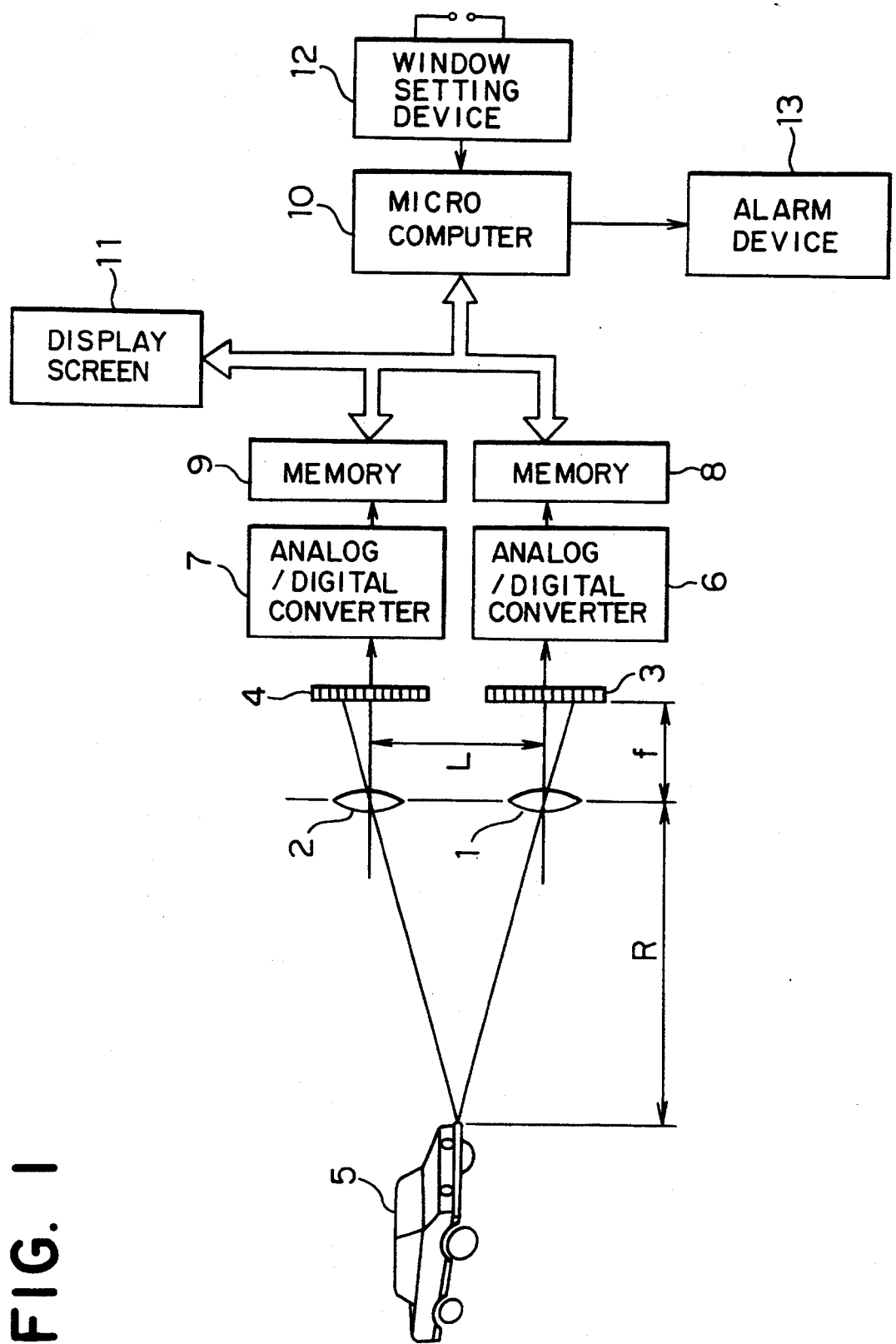
FIG. 1 is a block diagram of the apparatus for monitoring a vehicle travelling in a nearby lane in the rear of a vehicle having the apparatus mounted thereon in accordance with a first embodiment of the present invention.

Referring to FIG. 1, the monitoring apparatus comprises an optical system in the form of a stereo camera 23 (see FIG. 4) including a pair of lenses 1, 2 disposed horizontally apart from each other at a prescribed reference distance L, and a pair of two-dimensional image sensors 3, 4 employed for the lenses 1, 2, respectively. The optical system or stereo camera 23 can be mounted on a vehicle 22 (see FIG. 4) at an appropriate location thereof, e.g., at one side of the vehicle 22, as clearly illustrated in FIG. 4. Reference numeral 5 designates a nearby vehicle which is traveling in a nearby lane 24 (see FIG. 4), and which is an object to be monitored by the monitoring apparatus.

Figure 2:
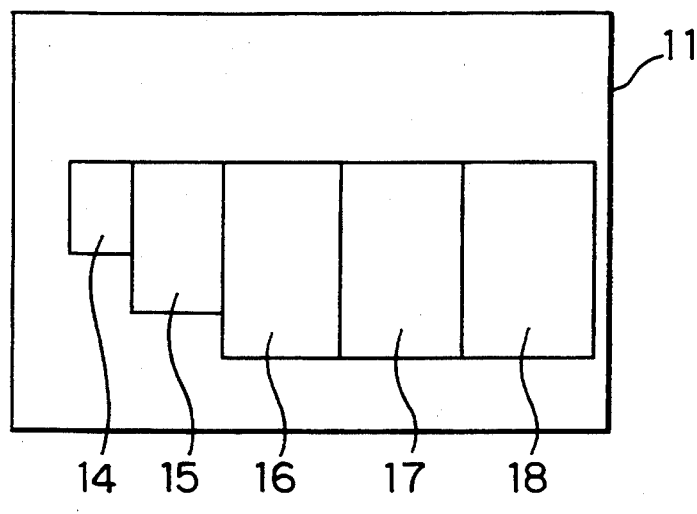
FIG. 2 shows a plurality of the windows for monitoring the field of rear side view of the vehicle in the nearby lane set in the display screen according to the present invention.

The monitoring apparatus further comprises a pair of analog/digital converters 6, 7 electrically connected to the image sensors 3, 4 for converting output signals of the image sensors 3, 4 from analog into digital form, a pair of memories 8, 9 electrically connected to the analog/digital converters 6, 7, respectively, for storing digitized output signals from the analog/digital converters 6, 7, a microcomputer 10 electrically connected to the memories 8, 9, a display screen 11 which is controlled by means of the microcomputer 10 to display images sensed by the image sensor 4, and a window setting device 12 for setting a plurality of windows which are used for monitoring surroundings (i.e., rearward and sidewise environment) of the subject vehicle 22 on which the monitoring apparatus of the invention is mounted, in order to specify or define an area on the display screen 11 for monitoring the presence of a nearby vehicle which is travelling rearwardly and/or laterally of the subject vehicle 22. As shown in FIG. 2, a plurality of windows 14, 15, 16, 17 and 18 as set by means of the window setting device 12 are preliminarily or provisionally disposed at specified positions of the display screen 11. An alarm device 13 in the form of a buzzer or the like is connected to the microcomputer 10 for alarming the driver of the vehicle as necessary.

Figure 3:
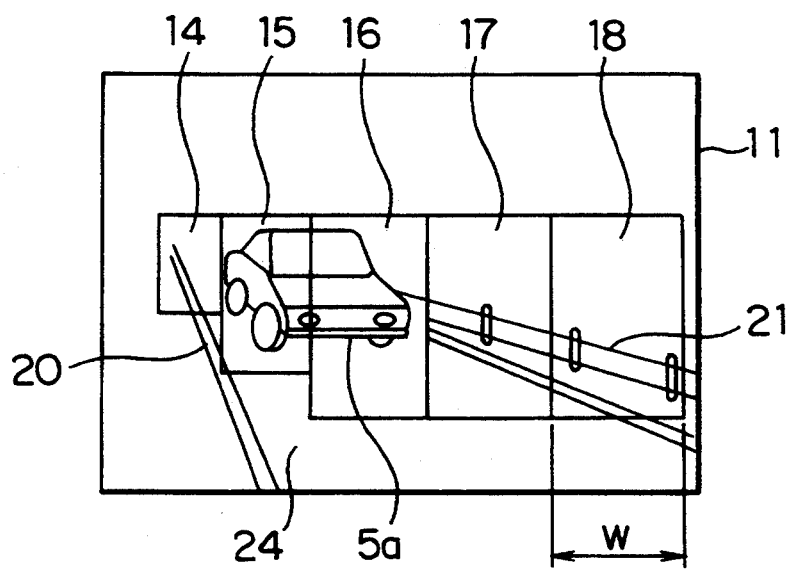
FIG. 3 shows a vehicle traveling to the rear in the nearby lane which is displayed in the display screen in which windows are set.

According to the construction described above, if an image 5a of a nearby vehicle 5 (FIG. 4) traveling rearwardly and sidewise of the subject vehicle 22 in a nearby lane 24 as shown in FIG. 3 is displayed on the display screen 11 which shows the rear and side field of view (i.e., rear and side surroundings) sensed by, for example, the image sensor 4 of the vehicle 22 (FIG. 4) which is traveling forwardly of the nearby vehicle 5, the microcomputer 10 reads a pixel signal in the window 16 which captures the image of the nearby vehicle from the memory 9 using this signal as a reference image signal for calculating the distance between these vehicles. To this end, the microcomputer 10 selects an area corresponding to the window 16 in the memory 8 in which the pixel signal from another image sensor 3 are stored, and it successively shifts pixels in the selected area of the memory 8 one by one with respect to the aforementioned reference pixel signal to obtain an image which best matches the image in the window 16.

The distance R from the subject vehicle 22 to the nearby vehicle 5 is expressed as follows:

$$R = (f \times L)/(n \times P) \quad (1)$$

where n represents the number of shifts; P represents a pixel pitch (interval or distance between adjacent pixels); $n \times P$ is an amount of total shift; L represents the length of the reference or base line of the stereo camera (i.e., the distance between the two lenses 1, 2); and f is the focal distance of the lenses 1, 2.

The distance R to the nearby vehicle 5, which lies rearwardly and laterally of the subject vehicle 22 and which has been captured by the window 16, is detected or measured by the microcomputer 10 which constitutes a distance detecting means. In this regard, this can be done by a processor with a program for executing arithmetic operations of the above expression (1). Likewise, it is also possible to detect distances up to other vehicles, which are travelling rearwardly and laterally and which are captured by the other windows 14, 15, 17 and 18. Japanese Patent Laid-Open No. 4-161810 has disclosed a method for detecting the distances to the vehicles as captured by the windows 14, 15, 16, 17 and 18, respectively.

Thus, it is possible to detect the distances to other rearward and/or sidewise vehicles which have been captured by the respective windows 14, 15, 16, 17 and 18, respectively. If any one of the distances detected in this manner decreases gradually to become lower than a specified value, the alarm device 13 is activated to inform the driver of the subject vehicle 22 of the presence of another vehicle approaching thereto.

If a lane separating line 20 on the surface of the road enters the window 14 as shown in FIG. 3, the distance up to the lane separating line 20 captured by the window 14 is detected. Likewise, if the windows 17, 18 have captured a guard rail 21, distances up to the guard rail 21 captured by the respective windows 17, 18 are detected. Thus, the lane separating line 20 and the guard rail 21 may be mistakenly identified as vehicles which lie in the rear and on one side of the subject vehicle 22.

Figure 4:
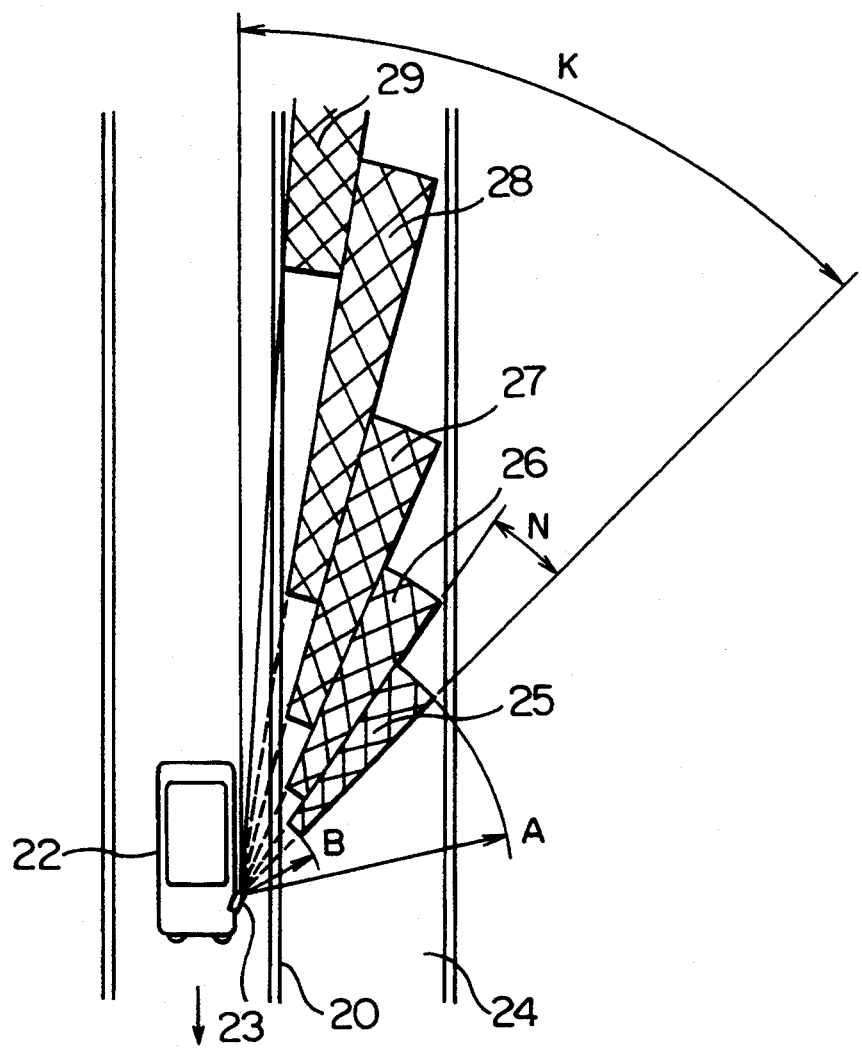
FIG. 4 is a view explaining the field of view and distance detecting range of each window.

To prevent such erroneous determinations, when the backward surroundings of the vehicle 22 is monitored by means of a stereo camera 23 mounted thereon as shown in FIG. 4, a distance detecting range 25 is set within the angle of the field of view N of the window 18 which corresponds to the width W of the window 18 as shown in FIG. 3, with respect to the angle of the field of view K of the stereo camera 23. For instance, in FIG. 4, let us assume that the angle of field view K of the stereo camera 23 be about 45 degrees and that of the window 18 be about 45 degrees. The window 14, which captures a relatively small image of a relatively distant vehicle running rearwardly and laterally of the the subject vehicle, is set to have a correspondingly limited angle of field view less than that N of the window 14. In this instance, since the width WT of the screen 11 corresponds to the angle of field view K of the video camera 23, as shown in FIG. 3, the width W of the window 18 is expressed as follows:

$$W = WT \times 10/45$$

To restrict the distance detecting range 25 within an adjacent traveling lane (a nearby lane) 24, a maximum distance A and a minimum distance B are respectively and provisionally predetermined for each window. Preferably, the minimum value substantially corresponds to the shortest distance from the apparatus to a nearby lane that is within the field of view of each window and that is adjacent a specific lane in which the subject vehicle equipped with the apparatus is travelling. The maximum value substantially corresponds to the longest distance therefrom to the nearby lane.

In the above instance, the maximum and minimum distances A and B are about 6 meters and 1.5 meters, respectively.

Likewise, distance detecting ranges 26, 27, 28, 29 of the windows 17, 16, 15, 14 are respectively set to restrict these ranges within the area of the nearby lane 24.

According to the present method for restricting the distance detecting ranges, all objects in the possible distance detecting range of each window are first detected and then only the objects, which lie within the predetermined distance limiting range of each window (i.e., objects lying rearwardly and laterally of the subject vehicle within the adjacent lane 24), are selected. By restricting the distance detecting range in each window to the rearward area of the adjacent lane 24 in the manner described above, it is possible to precisely distinguish and detect the nearby vehicles alone which are traveling in the rear of the subject vehicle 22 in the adjacent lane 24 from other objects such as the guard rail 21 and the lane separating line 20 which are out of the predetermined distance detecting range for each window. The range restricting means comprises, by way of an example, the microcomputer 10 which executes an appropriate processing program for the above purpose.

Specifically, by restricting the distance detecting ranges of the respective windows 14, 15, 16, 17, 18 within the nearby or adjacent lane 24, even if the respective windows 14, 15, 16, 17, 18 capture a lane separating line or a guard rail which is located out of the nearby or adjacent lane, it is possible to distinguish these objects from the nearby vehicle 5, thereby preventing the erroneous determinations described above. Moreover, such erroneous determinations can also be avoided by taking account of the fact that the distance to the lane separating line or the guard rail captured in each window never decreases as long as the subject vehicle is travelling forwards, while the distance to an approaching vehicle decreases. Furthermore, the images of these objects displayed on the screen are moving in the rearward direction, but the image of an approaching vehicle is moving in the forward direction, whereby these objects can be discriminated from the approaching vehicle on the basis of the direction of movement of each object.

Figure 5:
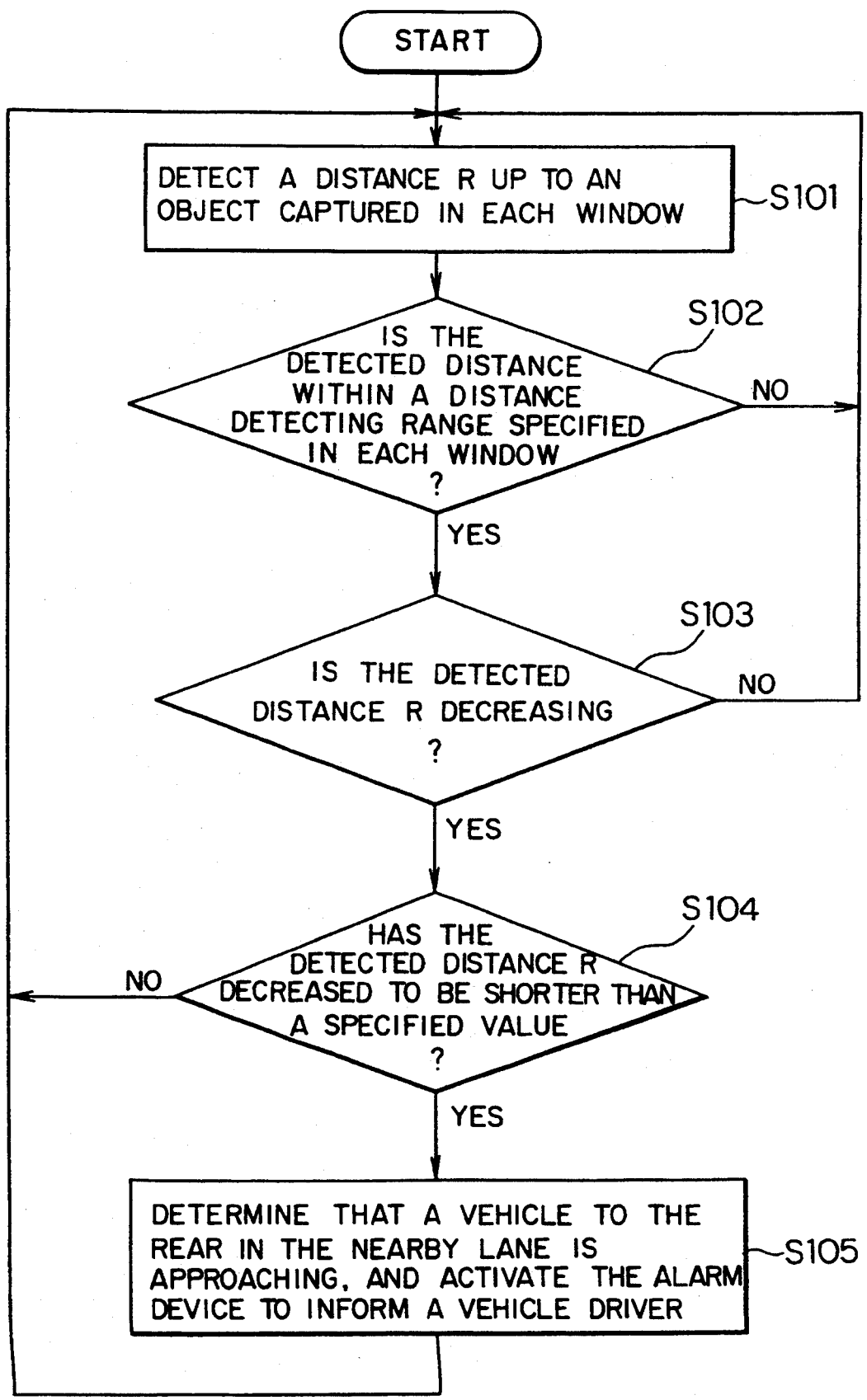
FIG. 5 is a flow chart showing the sequence of procedures of an embodiment according to the present invention.

FIG. 5 is a flow chart illustrating the aforementioned operational sequence from the time when distances up to objects captured by the respective windows 14, 15, 16, 17, 18 are detected. If the distances R up to the objects captured by the respective windows 14, 15, 16, 17, 18 are detected (step S101), it is determined whether the detected distances R are within the predetermined distance detecting ranges specified for the respective windows (step S102). If the detected distances R are within the corresponding distance detecting ranges, it is further determined whether the distance R successively detected for each window is decreasing (step S103). If the successively detected distance R is decreasing, it is determined that the object to which the distance R is within the distance detecting range predetermined for the corresponding window is a nearby vehicle 5 which is traveling in the adjacent or nearby lane 24 and which is approaching the vehicle 22. If the detected distance R becomes shorter than a prescribed value (for example, 10 m) (step S104), it is determined that there is a possibility of collision with the approaching vehicle 5, and hence the alarm device 13 is actuated to alert the driver of the vehicle (step S102). Thereafter, the above steps are repeated.

In the above-mentioned process, a plurality of distance detections or determinations are usually made during the time when a vehicle remains continuously captured in one and the same window, so a determination as to whether or not a vehicle captured in the window is approaching can be made on the basis of changes in the successively detected distances R thereto. Namely, if the successively detected distances R decrease, then it is determined that the vehicle in question is approaching.

Next, the second embodiment of the present invention will be described. Although in the first embodiment of the present invention, an apparatus for monitoring rearward and sidewise vehicles has been described, the vehicle-surroundings monitoring apparatus according to the present invention can be applied to an apparatus for monitoring the entire surroundings of the vehicle including the forward, rearward and sidewise fields of view thereof.

Figure 6:
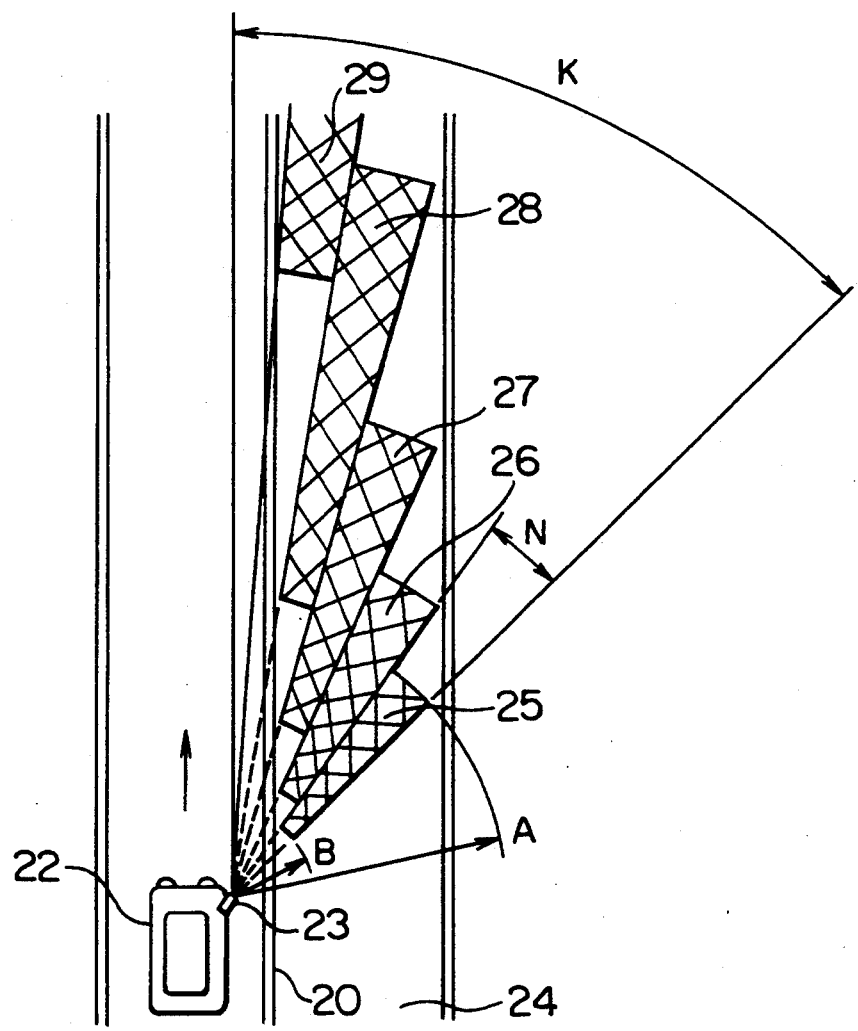
FIG. 6 is a view explaining the field of view and distance detecting range of each window in a second embodiment of the present invention.
Figure 7:
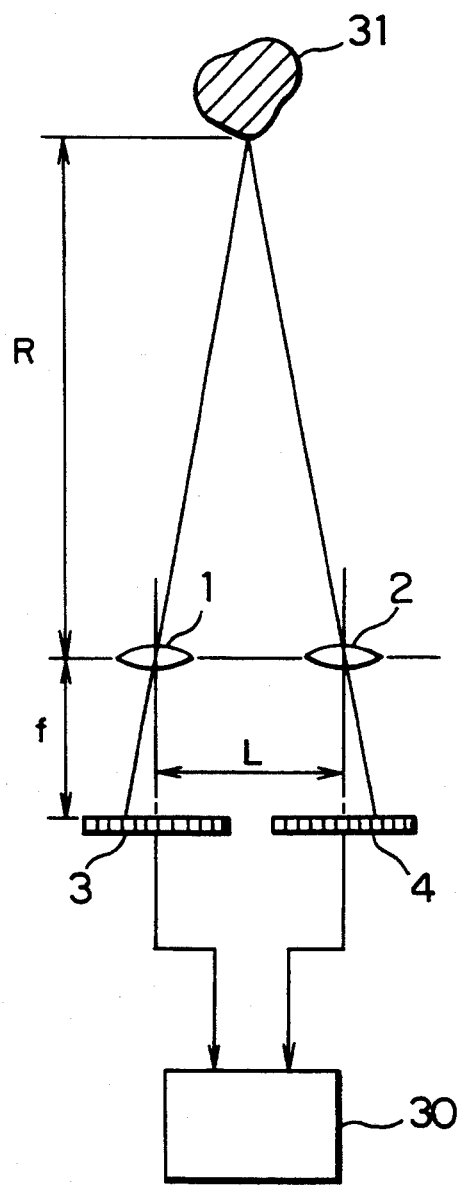
FIG. 7 is a block diagram of the distance detecting device which is used in conventional vehicle-surroundings monitoring apparatuses.

FIG. 6 shows the fields of view of the respective windows and distance detecting ranges in the case where the vehicle-surroundings monitoring apparatus of the invention is applied to an apparatus for monitoring vehicles which are travelling in .front of and on one side of a vehicle. In this embodiment, the stereo camera 23 is mounted on a vehicle at one side thereof in such a manner that it has a field of view oriented in the forward and sidewise direction of the vehicle 22. In the same manner as described in FIG. 4, the distance detecting ranges for respective windows are restricted to the forward area of an adjacent or nearby lane 24 so as to preclude the detection of the lane separating line 20 and the guard rail 21, thus preventing erroneous identification thereof as a nearby vehicle. According to the method for restricting the distance detecting ranges of the first embodiment described above, the distances of all objects located in the entire distance detecting ranges are detected by means of the respective windows 14, 15, 16, 17, 18, and then only the objects which are within a limited distance predetermined for each window (i.e., objects lying within the rearward area of the adjacent lane) are selected as valid objects, i.e., a nearby vehicle(s). However, according to this method, distance detections or scanning are performed for all objects lying in the entire distance detecting range for each window, arithmetic calculations performed for the objects which lie out of the limited detecting ranges are wasteful and useless. Accordingly, to avoid this, the number of pixel shifts or the range of shifting (i.e., the amount of shift) between both images sensed by the lenses 1, 2 for distance detection is specified or limited to a specific value which corresponds to the distance detecting range predetermined for each window. When distance detections are performed in each window, arithmetic calculations are performed only within the thus specified limited shifting range or the thus specified amount of shift, and hence processing for the objects outside the predetermined distance detecting ranges becomes unnecessary, thereby reducing the time required for distance detections.

Although, in the above embodiments, the distance detecting ranges are predetermined for respective windows, the respective distance detecting ranges can be varied depending on road information. Such road information comprises the kind of roads such as highway or ordinary road, the road type including lane widths and speed limits, and the like. It is possible to change the distance detecting ranges by manually inputting such data or by making the distance detecting ranges automatically change on the basis of navigator information. Further, it is also possible to make the distance detecting ranges variable by estimating road environments such as road type or degree of traffic jam depending on the speed of the vehicle on which the apparatus is mounted.

Although, in the embodiments described above, distances are detected according to the principles of trigonometry based on image information, it is possible to combine the vehicle-surroundings monitoring apparatus according to the present invention with, for example, detection of a distance by means of a laser radar which has been disclosed in Japanese Patent Laid-Open No.47-4011. This provides an excellent vehicle-surroundings monitoring apparatus which is capable of performing distance detection without losing accuracy even in darkness.

What is claimed is:

1. A vehicle-surroundings monitoring apparatus which is mounted on a vehicle for monitoring nearby objects lying therearound, said apparatus comprising:

sensing means including two optical systems for sensing said objects lying around said vehicle from two different points and forming images of said objects on image sensor means;

display means for displaying images of said objects on a screen;

window setting means for setting a plurality of windows on the screen of said display means;

distance detecting means for detecting the distance to each object in each of said windows based on the principles of trigonometry by detecting a deviation between images of each object sensed by said two optical systems through comparison therebetween; and detecting range restricting means for restricting a distance detecting range for each window to a predetermined range to thereby select as a nearby vehicle an object to which the distance is within the predetermined range.

2. The vehicle-surroundings monitoring apparatus according to claim 1, wherein said detecting range restricting means restricts said distance detecting range for each window to said predetermined range on the basis of prescribed road information.

3. The vehicle-surroundings monitoring apparatus according to claim 1, wherein said detecting range restricting means limits a total range of shifting for each window to a specific value corresponding to said predetermined range upon detecting said deviation between the images of an object in each window sensed by said two optical systems.

4. The vehicle-surroundings monitoring apparatus according to claim 1, wherein said predetermined range for each window is between a minimum value and a maximum value, the minimum value substantially corresponding to the shortest distance from the vehicle equipped with said apparatus to a nearby lane that is within the field of view of each window and that is adjacent a specific lane in which the vehicle equipped with said apparatus is travelling, the maximum value substantially corresponding to the longest distance therefrom to said nearby lane.

* * * * *